United States Patent [19]

Middlebrook

[11] Patent Number: 4,654,769
[45] Date of Patent: Mar. 31, 1987

[54] TRANSFORMERLESS DC-TO-DC CONVERTERS WITH LARGE CONVERSION RATIOS

[75] Inventor: Robert D. Middlebrook, Pasadena, Calif.

[73] Assignee: California Institute of Technology, Pasadena, Calif.

[21] Appl. No.: 667,868

[22] Filed: Nov. 2, 1984

[51] Int. Cl.$^4$ .................................. H02M 3/335
[52] U.S. Cl. .................................. 363/16; 363/61; 363/62
[58] Field of Search .................. 363/16, 59, 60, 61, 363/62; 320/1; 307/109, 110

[56] References Cited

U.S. PATENT DOCUMENTS

| 4,184,197 | 1/1980 | Cuk et al. | 363/16 |
| 4,186,436 | 1/1980 | Ishiwatari | 363/60 |
| 4,321,661 | 3/1982 | Sano | 363/60 |

FOREIGN PATENT DOCUMENTS

| 219345 | 2/1985 | Fed. Rep. of Germany | 363/59 |
| 204770 | 11/1983 | Japan | 363/60 |
| 204765 | 11/1983 | Japan | 307/109 |
| 987758 | 1/1983 | U.S.S.R. | 363/62 |

Primary Examiner—Peter S. Wong
Assistant Examiner—Judson H. Jones
Attorney, Agent, or Firm—Freilich, Hornbaker, Rosen & Fernandez

[57] ABSTRACT

A switching dc-to-dc converter with a variable conversion ratio of $NT_1/T_2$ or $T_1/NT_2$ utilizes N reactance elements, selected to be either all capacitors or all inductors, for energy transfer from a voltage source to a load. Switches are utilized for connecting the elements in parallel, or series, to the source, and for connecting the elements in series, or parallel, to the load, alternately. Operation of the switches that alternately connect the elements to the source, and switches that connect the elements to the load, determine the variable part of the conversion ratio $NT_1/T_2$ or $T_1/T_2N$ by control of the time $T_1$ that the elements are connected in series, or parallel, with the source, and of the time $T_2$ that the elements are connected in parallel, or series, with the load.

2 Claims, 7 Drawing Figures

TRANSFORMERLESS DC-TO-DC CONVERTERS WITH LARGE CONVERSION RATIOS

BACKGROUND OF THE INVENTION

This invention relates to switching dc-to-dc converters, and more particularly to such converters requiring large step-down or step-up conversion ratios without a transformer.

There is a growing need for switching dc-to-dc converters having large conversion ratios, for example, a converter/regulator to provide a +5 V output from a nominal −48 V input. Such a converter should have a low profile capable of assembly on a plug-in card for insertion in a conventional rack. Consequently, there is an obvious motivation to use a switching converter operating at a frequency of at least hundreds of kHz, in order to reduce the size of magnetic cores and to take advantage of hybrid construction techniques.

With the advent of power MOSFET transistors, the switching frequency is limited by the magnetic cores rather than by the switch. More specifically, it is a transformer that limits the frequency, rather than an inductor, because the ratio of leakage to primary inductance increases in a transformer as the physical size decreases. A transformer commonly provides two functions in a dc-to-dc switching converter: it provides dc isolation, and it provides an additional voltage conversion ratio over and above that available from the switch duty ratio.

In applications where dc isolation is not needed, a transformer (or an autotransformer) would normally still be required if the necessary voltage conversion ratio is large. For example, in a 50 V-to-5 V converter, the switch duty ratio would have to be about 0.1 if a transformer were not used, which severely limits the switching frequency and the dynamic range of the converter, and also has undesirable implications with respect to peak currents, loss of efficiency, and noise. On the other hand, if a transformer were used, the switching frequency would also be severely limited by the transformer itself.

OBJECTS AND SUMMARY OF THE INVENTION

An object of this invention is to provide a switching dc-to-dc converter capable of operating at a high switching frequency with a large step-down or step-up conversion ratio.

This and other objects of the invention are achieved in a switching dc-to-dc converter utilizing reactance elements for energy transfer from a voltage source to a load, where the ratio of the switch ON-time $T_1$ to OFF-time $T_2$ determines the output voltage, by dividing an energy transfer reactance element into N reactance elements, each with separate switching means for charging an discharging. For step-down conversion, the reactance elements are charged in series, thus dividing the input voltage among them, and discharged elements are charged in parallel and discharged in series.

With pure capacitors for the energy transfer reactors, the new step-down, or step-up, converter is comprised of N energy transfer capacitors connected in series, or parallel, by switching devices, one or more for each capacitor to charge in series, or in parallel, and one or more additional switching devices to discharge the capacitors in parallel, or in series.

In the case of a step-down converter, switching diodes connect the capacitors in series with a source for charging through an input inductor connected to a first (charge) terminal of the first of the series connected capacitors. Switching transistors, one for each capacitor, connect the first terminal of the capacitors to the return current path of the load while discharging all of the capacitors in parallel through an output inductor in series with the load. Buffer diodes, one for each capacitor, connect the second terminal of the capacitors to the output inductor. In that manner the capacitors are connected to the load in parallel with inverted polarity. For example, if charged negative in series through the first terminals, the capacitors are connected in parallel to the load with the second (positive) terminals connected to the load.

In the case of a step-up converter, the N capacitors are charged in parallel through switching transistors connected to the source by an input inductor, one transistor connected to the first terminal of each capacitor, except the first capacitor which has its first terminal connected directly to the input inductor, and one switching diode for each capacitor connected to the second terminal thereof, completing parallel charge circuits through the return current path of the source. Once charged, the capacitors are discharged in series by switching transistors, one for each capacitor, connecting the capacitors in series to the load through an output inductor connected to the second terminal of the Nth capacitor. The first capacitor has its first terminal connected to the return current path of the load through its switching transistor.

A strictly analogous step-up or step-down converter may be based upon the buck-boost converter, which uses pure inductors for the transfer reactance. In step-down, buck-boost converter, N inductors are charged in series through one set of switching transistors connecting the inductors in series with the source, one transistor for each inductor connected to a first terminal thereof, with the first inductor having its first terminal connected to the source by its series switching transistor and the Nth inductor having its second terminal connected to the return current path of said source. The inductors are discharged in parallel by another set of switching transistors, one for each inductor connecting its second terminal to the load return current path, and a set of buffer diodes, one for each inductor, connecting the first terminal of each inductor to the load.

In a step-up converter based on the buck-boost converter, a set of switching transistors, one for each of N inductors, connects the first terminal of each inductor to the source for charging in parallel, while a set of diodes, one for each of the inductors except the first, connects the second terminal of each of the inductors to the return current path of the source. The first inductor has its second terminal connected directly to the return current path of the source. A set of switching diodes, one for each inductor, automatically connects the inductors in series to the load wile the switching trnasistors are turned OFF, with the first terminal of the Nth inductor connected to the load by its diode in series, and the first terminal of each of the other inductors connected to the second terminal of each of the other inductors by its diode in series.

The novel features of the invention are set forth with particularity in the appended claims. The invention will best be understood from the following description when read in conjunction with the drawings.

DESCRIPTION OF THE PREFERRED EMBODIMENTS

Figure 1:
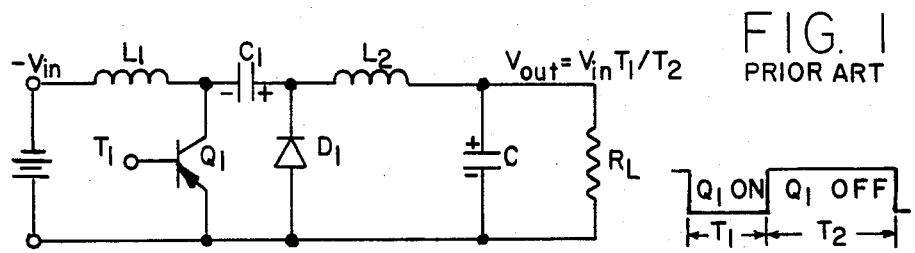
FIG. 1 is a schematic diagram of the prior-art Cuk dc-to-dc switching converter.

Referring to FIG. 1, which illustrates the basic Cuk dc-to-dc converter disclosed in U.S. Pat. No. 4,184,197, a dc input voltage $(-V_{in})$ is connected to an input inductor $L_1$. The input inductor is connected to an energy transfer capacitor $C_1$, and a PNP transistor $Q_1$ is provided for connecting the junction between the first inductor $L_1$ and the capacitor $C_1$ to ground. A switching diode $D_1$ connects the junction between the capacitor $C_1$ and a second inductor $L_2$ to ground. The second inductor $L_2$ is connected in series with a load $R_L$, and a filter capacitor C is connected in parallel with the load.

In operation, when the transistor is OFF (non-conducting) during an interval $T_2$, the capacitor $C_1$ is charged through the diode $D_1$, and when the transistor is switched ON (conducting) during an interval $T_1$, the diode is automatically switched OFF, thus placing the energy transfer capacitor $C_1$ in parallel with the load. As a result, the capacitor $C_1$ discharges through inductor $L_2$ into the load and filter capacitor. When the transistor switch is again turned OFF, the energy transfer capacitor $C_1$ is recharged while the inductor $L_2$ and filter capacitor C supplies current to the load. The filter capacitor C thus aids the inductor $L_2$ in filtering the output current ripple. The converson ratio $V_{out}/V_{in}$ of the basic Cuk dc-to-dc converter is $T_1/T_2$. For clarity, the base drive of the transistor $Q_1$ is labeled with the interval during which it is ON (conducting), which in this case is the interval $T_1$. This convention is used in all figures that follow.

The present invention utilizes the basic Cuk dc-to-dc converter to achieve large step-down or step-up voltage conversion ratios without a transformer, and without having to use very small fractional ON times in the switching transistor. In its simplest form shown in FIG. 2, the additional step-down conversion ratio is 2. Two energy transfer capacitors $C_1$ and $C_2$ are charged negative at their first terminal while connected in series during repetitive intervals $T_2$, while PNP transistors $Q_1$ and $Q_2$ are OFF, and discharged in parallel during intervals $T_1$, while the transistors are ON, thus effecting an overall conversion ratio of $T_1/2T_2$.

To connect the energy transfer capacitors $C_1$ and $C_2$ in series while the transistors $Q_1$ and $Q_2$ are OFF, the capacitor $C_2$ and its switching diode $D_2$ are connected in series with the capacitor $C_1$ and its switching diode $D_1$. When the transistors are switched ON during intervals $T_1$, the capacitor $C_2$ discharges into the load as in the basic Cuk converter, but the capacitor $C_1$ would be isolated by the diode $D_1$, which is then OFF. Consequently, an auxiliary (buffer) diode $DD_1$ is provided to connect the second (positive) terminal of capacitor $C_1$ to the input of the inductor $L_2$. The second terminal of the capacitor $C_2$ is connected directly to the input of the inductor $L_2$.

Figure 3:
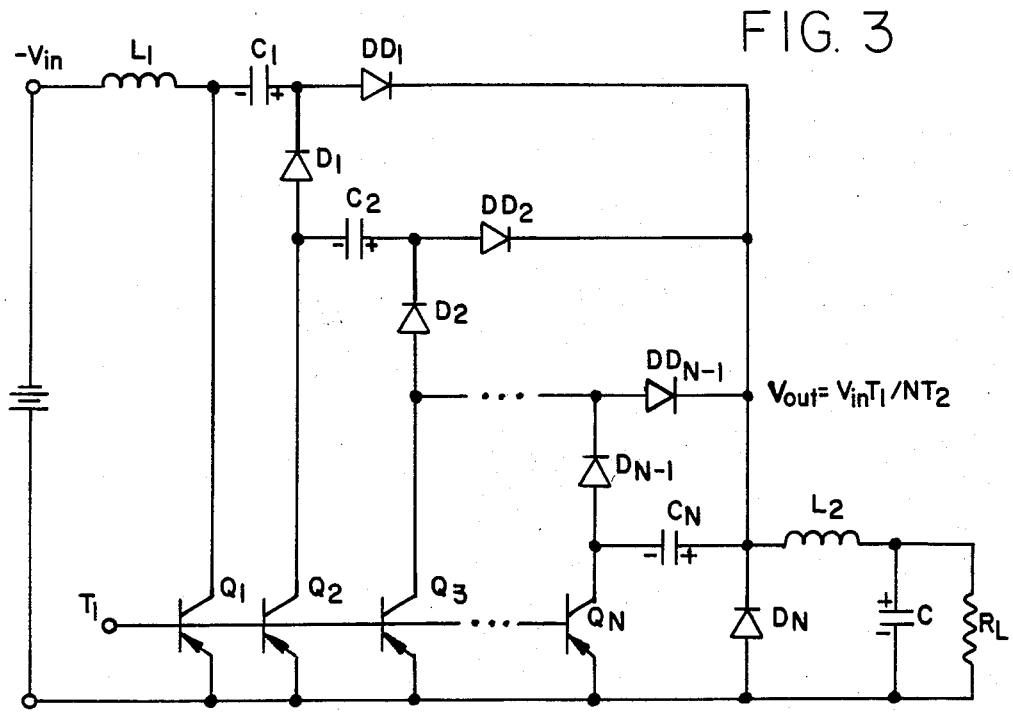
FIG. 3 is a schematic diagram of an extension of the switching converter of FIG. 2 to a step-down conversion ratio of N.

This concept can be generalized to N capacitors charged in series and discharged in parallel, as shown in FIG. 3, so that the overall conversion ratio is $T_1/NT_2$.

It is evident that N energy transfer capacitors $C_1$, $C_2$ ... $C_N$ are connected in series by switching diodes $D_1$, $D_2$ ... $D_N$ while PNP transistors $Q_1$, $Q_2$ ... $Q_N$ are OFF. When all the transistors are switched ON simultaneously, the switching diodes are switched OFF automatically, and the energy transfer capacitors discharge into the load via the inductor $L_2$ through buffer diodes $DD_1$ through $DD_{N-1}$, one for each capacitor except the last which has its second (positive) terminal connected directly to the output inductor $L_2$. Consequently, there are N-1 buffer diodes, one for each of the capacitors $C_1$, $C_2$ ... $C_{N-1}$.

Figure 2:
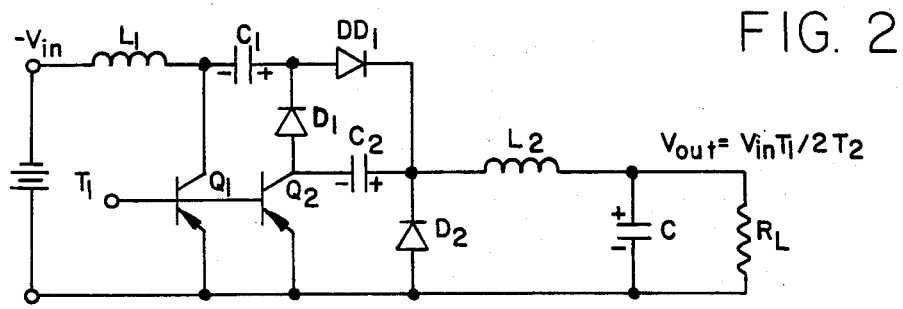
FIG. 2 is a schematic diagram of a voltage step-down converter based on the basic Cuk converter with a step-down conversion ratio of 2.

The voltage step-down Cuk converters described with reference to FIGS. 2 and 3 are based on the energy transfer capacitor being divided into N capacitors which are charged in series, and discharged in parallel, thus effecting an additional voltage step-down conversion ratio of N. Each extra energy transfer capacitor requires one extra switching transistor and diode, and one buffer diode. An analogous extension leads to a voltage step-up Cuk converter in which N capacitors are charged in parallel and discharged in series, as shown in FIG. 4 for N equal to 2.

Figure 4:
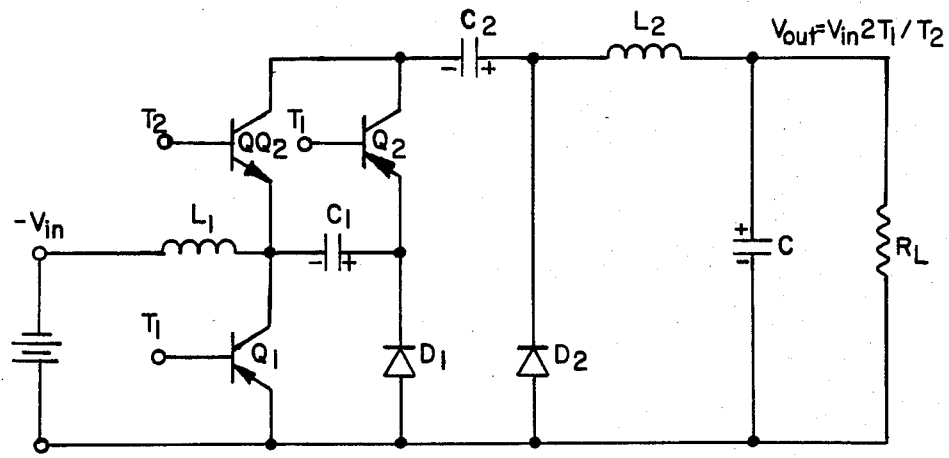
FIG. 4 is a schematic diagram of a voltage step-up converter that is an analogous extenion of the step-down converter shown in FIG. 2.

Referring to FIG. 4, while PNP transistors $Q_1$ and $Q_2$ are OFF, NPN transistor $QQ_2$ is turned ON for the same interval $T_2$ to allow capacitor $C_2$ to be charged in parallel with capacitor $C_1$ via the input inductor $L_1$ connected to the first terminal of the capacitor $C_2$ by its switching transistor $QQ_2$ and its switching diode $D_2$ connecting the second terminal of the capacitor to the return current path of the source while the capacitor $C_1$ is charged through its switching doide $D_1$. When the transistor $Q_1$ and $Q_2$ are turned ON, the switching transistor $QQ_2$ is simultaneously turned OFF for the same interval $T_1$ so the capacitor $C_1$ in series with the transistor $Q_2$ is discarged into the output inductor $L_2$ through the capacitor $C_2$ in series.

Figure 5:
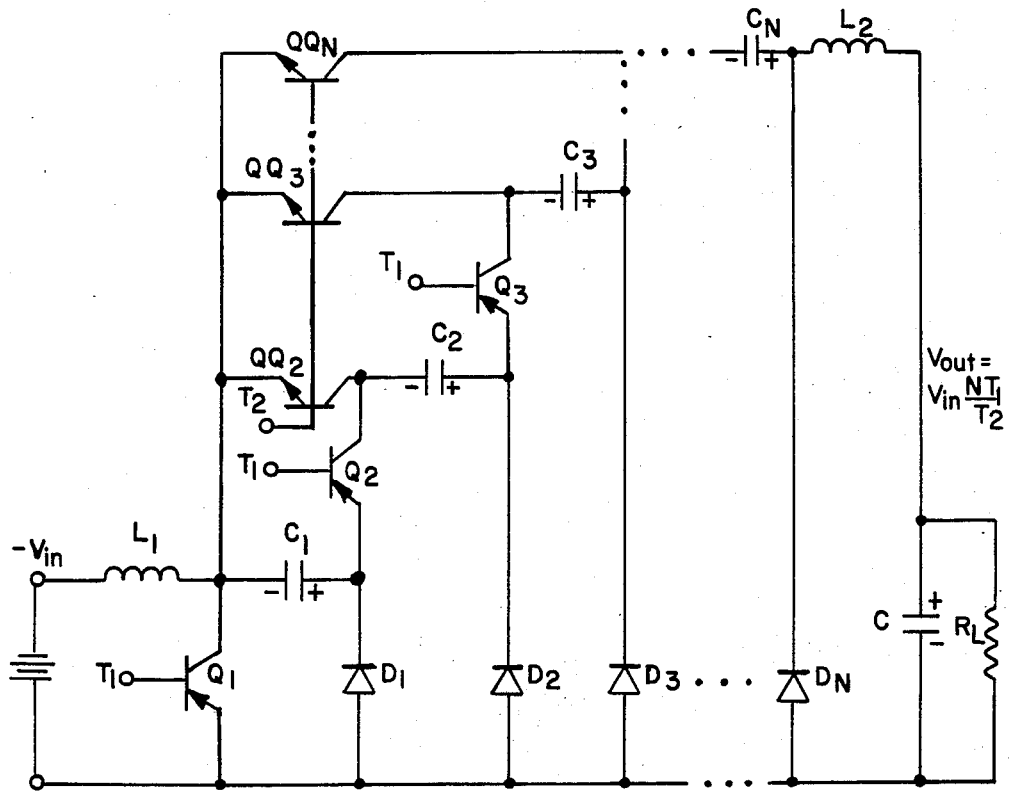
FIG. 5 is a schematic diagram of an extension of a voltage step-up converter of FIG. 4 to a step-up conversion ratio of N.

This step-up dc-to-dc voltage conversion concept can also be generalized to where N capacitors are charged in parallel and discharged in series, as shown in FIG. 5. The overall conversion ratio is then $NT_1/T_2$. Each of the extra capacitors $C_2$-$C_N$ requires its own PNP switching transistor $Q_2$-$Q_N$ for series discharge, and its own switching diode $D_2$-$D_N$ plus an auxiliary switching transistor $QQ_2$-$QQ_N$ for parallel charge. These auxiliary switching transistors are NPN so that a common drive can be used for all of them.

Figure 6:
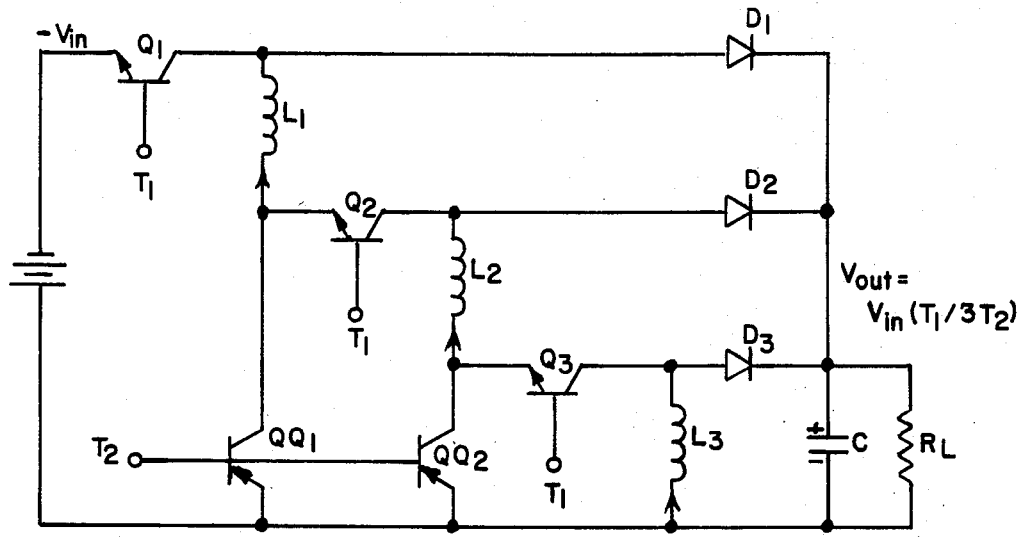
FIG. 6 is a schematic diagram of a voltage step-down dc-to-dc converter with a conversion ratio of 3 based on the buck-boost converter which utilizes an inductor for energy transfer.
Figure 7:
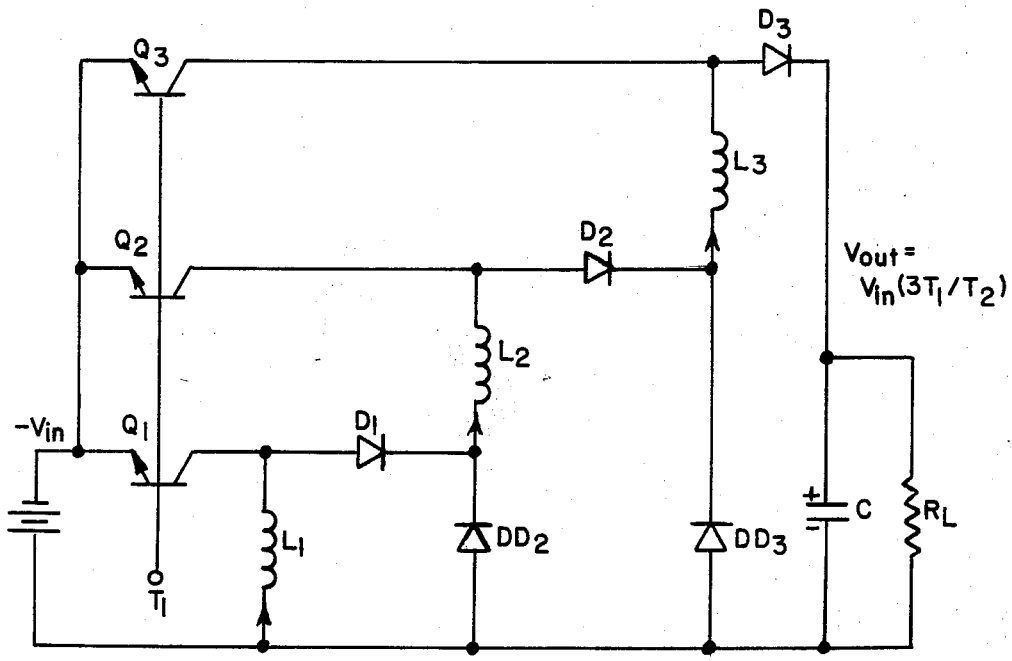
FIG. 7 is a schematic diagram of a voltage step-up converter that is analogous to the step-down converter of FIG. 6.

Voltage step-down and step-up dc-to-dc switching converters can also be implemented by utilizing the basic buck-boost converter in an arrangement as shown in FIGS. 6 and 7. It will be recalled that the buck-boost converer utilizes an energy transfer inductor instead of a capacitor. Basically, a switching transistor is turned ON to charge the inductor, and once it is turned OFF, a switching diode is automatically switched ON to allow energy stored in the inductor to discharge through the load. Both the switching transistor and the switching diode are connected to a first terminal of the inductor. The second terminal is connected to the return current paths of the source and the load.

In the voltage step-down converter of FIG. 6, NPN switching transistors $Q_1$, $Q_2$ and $Q_3$ connect the buck-boost inductors in series for charging for an interval $T_1$ while auxiliary PNP transistors $QQ_1$ and $QQ_2$ disconnect the second terminals of the inductors $L_1$ and $L_2$ from the return current paths of the source and the load. When the transistors $Q_1$, $Q_2$ and $Q_3$ are turned OFF for an interval $T_2$, auxiliary PNP transistors $QQ_1$ and $QQ_2$ are turned ON for an equal interval $T_2$ to connect the second terminals of the inductors $L_1$ and $L_2$ to the return current path of the load in parallel with the load $R_L$ through switching diodes $D_1$, $D_2$ and $D_3$. For each inductor except the last there is required one additional transistor $QQ_1$ and $QQ_2$ besides the associated switching diodes $D_1$ and $D_2$. The circuit may be extended to include N inductors for a voltage step-down dc-to-dc converter with a conversion ratio of $T_1/NT_2$.

In a voltage step-up converter shown in FIG. 7, NPN switching transistors $Q_1$, $Q_2$ and $Q_3$ charge the buck-boost inductors $L_1$, $L_2$ and $L_3$ in parallel while turned ON for an interval $T_1$. For the additional inductors $L_2$ and $L_3$, additional buffer diodes $DD_2$ and $DD_3$ are required to complete the charge current path. Switching diodes $D_1$, $D_2$ and $D_3$ are reverse biased during this interval $T_1$. Once the switching transistors $Q_1$-$Q_3$ are turned OFF for an interval $T_2$, switching diodes $D_1$, $D_2$ and $D_3$ are substantially turned ON for an interval $T_2$ to discharge the stored energy in the inductors through the load in series. Note that the first terminal of each inductor is negative while the inductor is being charged, and becomes positive while the inductor is being discharged.

The step-up converter circuit of FIG. 7 may be extended to include N inductors for a voltage step-up dc-to-dc converter with a conversion ratio of $NT_1/T_2$ by connecting additional inductors in series. Each additional inductor will have it own associated switching diode and transistor, and its own additional buffer diode required to complete the connection of the second terminal of the inductor to the source return current path.

Although particular embodiments of the invention have been described and illustrated herein, it is recognized that modifications and variations may readily occur to those skilled in the art, particularly in the selection of the semiconductor switches. For example, power MOSFET transistors may be used in place of the bipolar transistors shown, and the diode switches, including those diode switches sometimes referred to as buffer diodes, may be repalced by transistor switches. Any switching devices that pass ON current and support OFF voltages in the required directions may be used. Also, as for any three-terminal dc-to-dc converter, the source and load may be connected between any pairs of terminals, as long as the switches are capable of passing ON current and supporting OFF voltages of the proper polarities. Also reference to a particular polarity of the source and of the load voltages is for convenience. The polarity of the soure can be readily reversed by making the necessary changes in the switches (reversing polarity of diodes and interchanging NPN and PNP transistors throughout), thus reversing the voltages at the load. Consequently, it is intended that the claims be interpreted to cover such modifications and variations.

What is claimed is:

1. Switching dc-to-dc converter with a selected conversion ratio comprised of N capacitors for energy transfer from a dc voltage source to a load, first switching means for connecting said capacitors in series to said source, and second switching means for connecting said capacitors in parallel to said load for a conversion ratio of $T_1/NT_2$, where $T_1$ is the conducting time interval and $T_2$ is the nonconducting time interval of said second switching means, and vice versa for the first switching means, as said first and second switching means are alternately switched on repetitively, wherein said capacitors each have a first and second terminal, said converter including an input inductor connected directly in series between said converter and said source and an output inductor connected directly in series between said converter and said load, and said first switching means for connecting said elements in series with said source through said inductor is comprised of separate switching devices, one between each two capacitors connected in series, with said input inductor connected to said first terminal of the first capacitor, and a switching device between said second terminal of each capacitor and the next in series and a switching device between said second terminal of the last capacitor and a return current path to said source, and said second switching means for connecting said elements in parallel with said load is comprised of separate switching devices, one connecting said first terminal of each capacitor to said return current path of said load and a separate switching device connecting said second terminal of each capacitor directly to said output inductor, except the last capacitor which has its second terminal connected directly to said output inductor for discharge while said separate switching devices of said second switching means are connecting and said separate switching devices of said first switching means are not conducting, whereby a regulated output voltage is provided as a function of $T_1/NT_2$.

2. A switching dc-to-dc converter with a selected conversion ratio comprised of N capacitors for energy transfer from a dc voltage source to a load, first switching means for connecting said capacitors in parallel to said source, and second switching means for connecting said capacitors in series to said load for a conversion ratio of $NT_1/T_2$, where $T_1$ is the conducting time interval and $T_2$ is the nonconducting time interval of said second switching means, and vice versa for the first switching means, as said first and second means are altenately switched on repetitively, wherein said capacitors each have a first and second terminal, said converter including an input inductor connected directly in series between said converter and said source and an output inductor connected directly in series between said converter and said load, and said first switching means for connecting said elements in parallel with said source is comprised of a first separate switching device, one between said second terminal of each capacitor and a return current path to said source, and a second switching device connecting said first terminal of each capacitor directly to said input inductor, except the first capacitor which has it first terminal connected directly to said input inductor for charge while said separate switching devices of said first switching means are conducting, and said second switching means for connecting said elements in series with said load through said output inductor is comprised of separate switching devices, one for each capacitor, for connecting said capacitors in series between said output inductor and a return current path of said load while said first switching means is not conducting, whereby a regulated output voltage is provided as a function of $NT_1/T_2$.

* * * * *